US010830511B2

(12) United States Patent
Schroeder

(10) Patent No.: US 10,830,511 B2
(45) Date of Patent: Nov. 10, 2020

(54) REFRIGERATOR APPLIANCES AND SEALED REFRIGERATION SYSTEMS THEREFOR

(71) Applicant: Haier US Appliance Solutions, Inc., Wilmington, DE (US)

(72) Inventor: Michael Goodman Schroeder, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 15/907,411

(22) Filed: Feb. 28, 2018

(65) Prior Publication Data
US 2019/0264960 A1 Aug. 29, 2019

(51) Int. Cl.
*F25B 39/00* (2006.01)
*F25B 41/00* (2006.01)
(Continued)

(52) U.S. Cl.
CPC .............. *F25B 39/00* (2013.01); *F25B 13/00* (2013.01); *F25B 41/00* (2013.01); *F25D 19/006* (2013.01)

(58) Field of Classification Search
CPC .......... F28F 13/12; F28F 13/125; F28F 13/08; F28F 1/00; F25B 2321/00;
(Continued)

(56) References Cited

U.S. PATENT DOCUMENTS 3,866,668 A * 2/1975 Doerner ................ F04D 17/161
415/90
5,297,623 A * 3/1994 Ogushi ................ F28F 13/125
165/121
(Continued)

FOREIGN PATENT DOCUMENTS

CN 201772566 U 3/2011
FR 2846033 A1 * 4/2004 ............. F04D 5/001
JP 3205196 B2 9/2001

OTHER PUBLICATIONS

Momen, et al.: Novel Frost Handling Techniques Using Air Bearing Heat Exchangers for Household Refrigerators; ASRAE Annual Conference; Jul. 2015.*
(Continued)

*Primary Examiner* — Tavia Sullens
(74) *Attorney, Agent, or Firm* — Dority & Manning, P.A.

(57) ABSTRACT

A refrigerator, including a sealed refrigeration system, is provided herein. The sealed refrigeration system may include a compressor, a phase separator, and a rotatable heat exchanger. The phase separator may be in fluid communication with the compressor and include a separator body defining an inner face and an outer face. The inner face may define a refrigerant cavity. The outer face may be directed away from the refrigerant cavity opposite the inner face. The rotatable heat exchanger may include a thermally conductive body and a plurality of spaced planar fins. The thermally conductive body may be positioned about the outer face along a rotation axis. The planar fins may extend from the
(Continued)

thermally conductive body in a radial direction away from the phase separator. The plurality of spaced planar fins may define an axial intake channel extending parallel to the rotation axis through one or more planar fins.

20 Claims, 7 Drawing Sheets

(51) Int. Cl.
*F25B 13/00* (2006.01)
*F25D 19/00* (2006.01)

(58) Field of Classification Search
CPC .......... F25B 2321/001; F25B 2321/002; F25B 2321/0022; F25B 39/00; F25B 39/02; F25B 13/00; F25B 41/00; F25B 19/00; F25B 19/006; F25B 2400/02; F25B 2400/23; F25B 43/006; F04D 5/00; F04D 5/001; F04D 17/161; H01L 23/467
USPC .......... 415/90; 62/3.1, 3.6, 3.5, 5, 6; 361/697
See application file for complete search history.

(56) References Cited

U.S. PATENT DOCUMENTS

| | | |
|---|---|---|
| 6,328,527 B1 | 12/2001 | Comrad et al. |
| 8,161,762 B2 | 4/2012 | Sugimoto et al. |
| 8,988,881 B2 | 3/2015 | Koplow |
| 2006/0021735 A1* | 2/2006 | Lopatinsky ........... H01L 23/467 165/80.3 |
| 2008/0236171 A1* | 10/2008 | Saito ...................... F25B 21/00 62/3.1 |
| 2010/0177480 A1 | 7/2010 | Koplow |
| 2011/0103011 A1 | 5/2011 | Koplow |
| 2014/0305139 A1* | 10/2014 | Takahashi ............... F25B 21/00 62/3.1 |

OTHER PUBLICATIONS

Johnson et al.: Development and Evaluation of a Sandia Cooler-based Refrigerator Condenser; Sandia National Laboratories; Jul. 2015.*

Koplow: A Fundamentally New Approach to Air-cooled Heat Exchangers: Sandia National Laboratories; Jan. 2010.*

* cited by examiner

REFRIGERATOR APPLIANCES AND SEALED REFRIGERATION SYSTEMS THEREFOR

FIELD OF THE INVENTION

The present subject matter relates generally to sealed refrigeration systems and refrigerator appliances including one or more sealed refrigeration systems.

BACKGROUND OF THE INVENTION

Various assemblies or appliances make use of one or more sealed refrigeration systems to cool portions of the assembly or appliance. For instance, refrigerator appliances generally include a cabinet that defines a chilled chamber that is often cooled with a sealed refrigeration system. Such sealed refrigeration systems may include one or more phase-separator elements, such as a condenser or an evaporator. Heat-exchange features are commonly included with the phase-separator elements to improve the performance of the phase-separator elements. For instance, some existing evaporators incorporate multiple static blades to conduct heat between an ambient environment and a refrigerant fluid flowing through the sealed refrigeration system. Further conventional systems may provide a blower or axial fan to force air over the phase-separator elements in an effort to accelerate a heat exchange with the phase-separator elements.

The efficacy and efficiency of a sealed refrigeration system may be, at least in part, contingent on the amount of heat that can be exchanged at the phase-separator elements. However, many existing systems struggle to consistently exchange adequate amounts of heat to/from the phase-separator elements. Moreover, certain systems, such as those utilizing multiple static blades to improve heat exchange, require significant amounts of space in order for their corresponding heat-exchange features to be effective. In the case of a system that uses a blower or fan, the rotation of the fan may generate significant amounts of undesirable noise. These constraints can limit the usability of the overall apparatus or appliance. For instance, in the case of refrigerator appliances, the increased space needed for the heat-exchange elements naturally limits the potential size of other portions of the appliance, such as the chilled chamber. The noise generated by one or more fans may limit the areas in which a user may want to install the appliance.

Therefore, there is a need for further improvements to sealed refrigeration systems. In particular, it would be advantageous to provide a sealed refrigeration system having one or more features for quietly and effectively drawing heat to or from a phase separator while requiring relatively little additional space.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a sealed refrigeration system is provided. The sealed refrigeration system may include a compressor, a phase separator, and a rotatable heat exchanger. The compressor may compress a refrigerant fluid through the sealed refrigeration system. The phase separator may be in fluid communication with the compressor and include a separator body defining an inner face and an outer face. The inner face may define a refrigerant cavity within the separator body. The outer face may be directed away from the refrigerant cavity opposite the inner face. The rotatable heat exchanger may include a thermally conductive body and a plurality of spaced planar fins. The thermally conductive body may be positioned about the outer face of the separator body along a rotation axis. The plurality of spaced planar fins may extend from the thermally conductive body in a radial direction away from the phase separator. The plurality of spaced planar fins may define an axial intake channel extending parallel to the rotation axis through one or more planar fins of the plurality of spaced planar fins.

In another exemplary aspect of the present disclosure, a sealed refrigeration system is provided. The sealed refrigeration system may include a compressor, a phase separator, and a rotatable heat exchanger. The compressor may compress a refrigerant fluid through the sealed refrigeration system. The phase separator may be in fluid communication with the compressor and include a separator body defining an inner face and an outer face. The inner face may define a refrigerant cavity within the separator body. The outer face may be directed away from the refrigerant cavity opposite the inner face. The rotatable heat exchanger may include a thermally conductive body, a plurality of spaced planar fins, and a plurality of spacers. The thermally conductive body may be positioned about the outer face of the separator body along a rotation axis. The plurality of spaced planar fins may extend from the thermally conductive body in a radial direction away from the phase separator. The plurality of spaced planar fins may define an axial intake channel extending parallel to the rotation axis through one or more planar fins of the plurality of spaced planar fins. The plurality of spacers may maintain a common axial distance between adjacent-fin pairs of the plurality of planar fins.

In yet another exemplary aspect of the present disclosure, refrigerator appliance is provided. The refrigerator appliance may include a cabinet defining a chilled chamber and a sealed refrigeration system mounted to the cabinet to cool the chilled chamber. The sealed refrigeration system may include a compressor, a phase separator, and a rotatable heat exchanger. The compressor may compress a refrigerant fluid through the sealed refrigeration system. The phase separator may be in fluid communication with the compressor and include a separator body defining an inner face and an outer face. The inner face may define a refrigerant cavity within the separator body. The outer face may be directed away from the refrigerant cavity opposite the inner face. The rotatable heat exchanger may include a thermally conductive body and a plurality of spaced planar fins. The thermally conductive body may be positioned about the outer face of the separator body along a rotation axis. The plurality of spaced planar fins may extend from the thermally conductive body in a radial direction away from the phase separator. The plurality of spaced planar fins may define an axial intake channel extending parallel to the rotation axis through one or more planar fins of the plurality of spaced planar fins.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
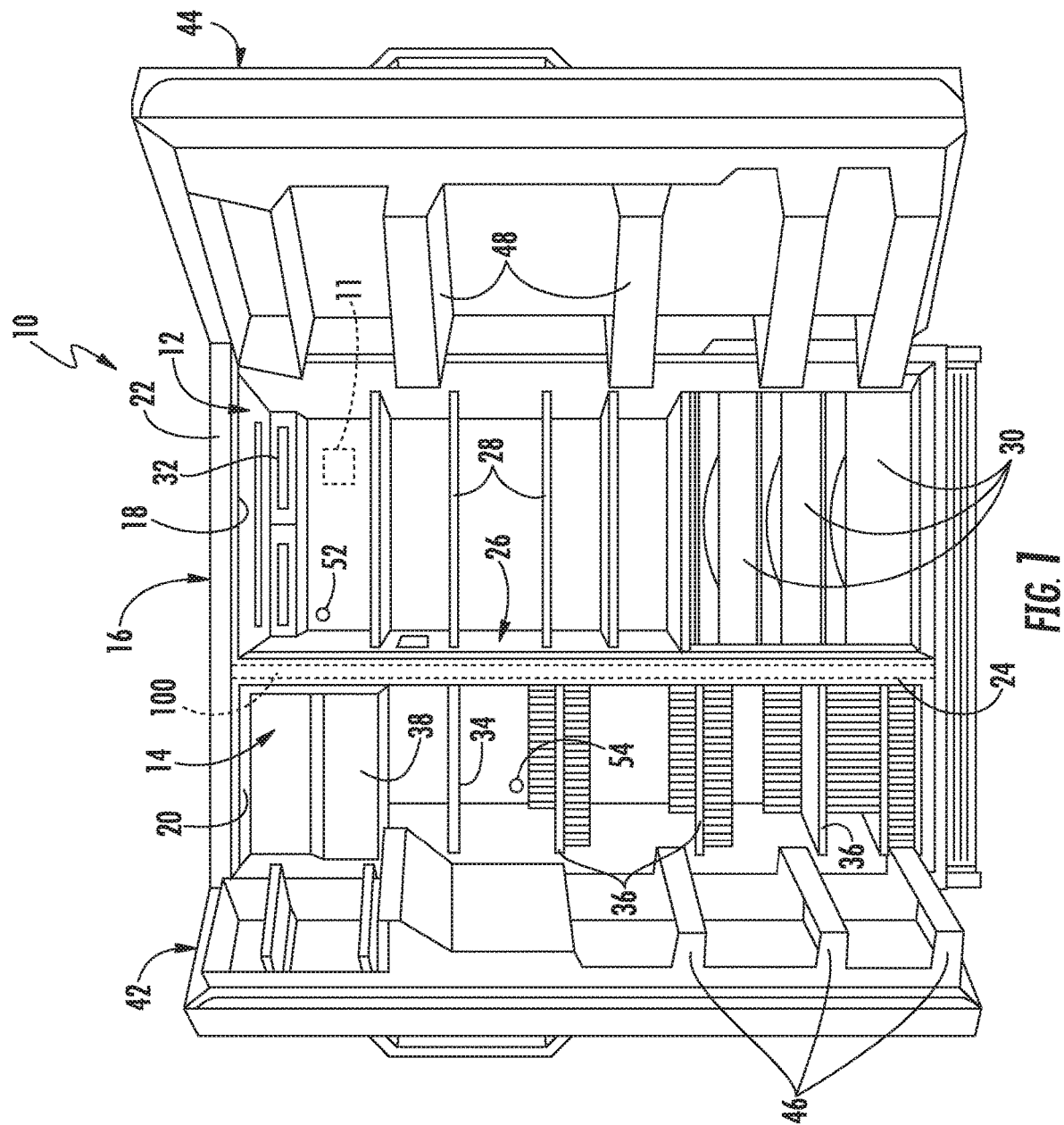
FIG. 1 provides a front perspective view of a refrigerator appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The term "or" is generally intended to be inclusive (i.e., "A or B" is intended to mean "A or B or both"). The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. Furthermore, as used herein, terms of approximation, such as "approximately," "substantially," or "about," refer to being within a ten percent margin of error.

Generally, the present disclosure provides a sealed refrigeration system for use in, as an example, a refrigerator appliance. The sealed refrigeration system may assist or control cooling in the refrigerator appliance and may include one or more active rotating heat exchangers that define one or more channels for airflow. The channels for airflow may be perpendicular to the rotation axis.

FIG. 1 provides a front view of a representative refrigerator appliance 10 according to exemplary embodiments of the present disclosure. More specifically, for illustrative purposes, the present disclosure is described with a refrigerator appliance 10 having a construction as shown and described further below. As used herein, a refrigerator appliance includes appliances such as a refrigerator/freezer combination, side-by-side, bottom mount, compact, and any other style or model of refrigerator appliance. Accordingly, other configurations including multiple and different styled compartments could be used with refrigerator appliance 10, it being understood that the configuration shown in FIG. 1 is by way of example only.

Refrigerator appliance 10 includes a fresh food storage compartment 12 and a freezer storage compartment 14. In some embodiments, freezer compartment 14 and fresh food compartment 12 are arranged side-by-side within an outer case 16 and defined by inner liners 18 and 20 therein. A space between case 16 and liners 18, 20 and between liners 18, 20 may be filled with foamed-in-place insulation. Outer case 16 normally is formed by folding a sheet of a suitable material, such as pre-painted steel, into an inverted U-shape to form the top and side walls of case 16. A bottom wall of case 16 normally is formed separately and attached to the case side walls and to a bottom frame that provides support for refrigerator appliance 10. Inner liners 18 and 20 are molded from a suitable plastic material to form freezer compartment 14 and fresh food compartment 12, respectively. Alternatively, liners 18, 20 may be formed by bending and welding a sheet of a suitable metal, such as steel.

A breaker strip 22 extends between a case front flange and outer front edges of liners 18, 20. Breaker strip 22 is formed from a suitable resilient material, such as an extruded acrylo-butadiene-styrene based material (commonly referred to as ABS). The insulation in the space between liners 18, 20 is covered by another strip of suitable resilient material, which also commonly is referred to as a mullion 24. In one embodiment, mullion 24 is formed of an extruded ABS material. Breaker strip 22 and mullion 24 form a front face, and extend completely around inner peripheral edges of case 16 and vertically between liners 18, 20. Mullion 24, insulation between compartments, and a spaced wall of liners separating compartments, sometimes are collectively referred to herein as a center mullion wall 26. In addition, refrigerator appliance 10 includes shelves 28 and slide-out storage drawers 30, sometimes referred to as storage pans, which normally are provided in fresh food compartment 12 to support items being stored therein.

Refrigerator appliance 10 can be operated by one or more controllers 11 or other processing devices according to programming or user preference via manipulation of a control interface 32 mounted (e.g., in an upper region of fresh food storage compartment 12 and connected with controller 11). Controller 11 may include one or more memory devices (e.g., non-transitive memory) and one or more microprocessors, such as a general or special purpose microprocessor operable to execute programming instructions or micro-control code associated with the operation of the refrigerator appliance 10. The memory may represent random access memory such as DRAM, or read only memory such as ROM or FLASH. In one embodiment, the processor executes programming instructions stored in memory. The memory may be a separate component from the processor or may be included onboard within the processor. Controller 11 may include one or more proportionalintegral ("PI") controllers programmed, equipped, or configured to operate the refrigerator appliance according to various control methods. Accordingly, as used herein, "controller" includes the singular and plural forms.

Controller 11 may be positioned in a variety of locations throughout refrigerator appliance 10. In the illustrated embodiment, controller 11 may be located, for example, behind an interface panel 32 or doors 42 or 44. Input/output ("I/O") signals may be routed between the control system and various operational components of refrigerator appliance 10 along wiring harnesses that may be routed through, for example, the back, sides, or mullion 26. Typically, through user interface panel 32, a user may select various operational features and modes and monitor the operation of refrigerator appliance 10. In one embodiment, the user interface panel 32 may represent a general purpose I/O ("GPIO") device or functional block. In one embodiment, the user interface panel 32 may include input components, such as one or more of a variety of electrical, mechanical or electro-mechanical input devices including rotary dials, push buttons, and touch pads. The user interface panel 32 may include a display component, such as a digital or analog display device designed to provide operational feedback to a user. User interface panel 32 may be in communication with controller 11 via one or more signal lines or shared communication busses.

In some embodiments, one or more temperature sensors are provided to measure the temperature in the fresh food compartment 12 and the temperature in the freezer compartment 14. For example, first temperature sensor 52 may be disposed in the fresh food compartment 12 and may measure the temperature in the fresh food compartment 12. Second temperature sensor 54 may be disposed in the freezer compartment 14 and may measure the temperature in the freezer compartment 14. This temperature information can be provided (e.g., to controller 11 for use in operating refrigerator 10). These temperature measurements may be taken intermittently or continuously during operation of the appliance or execution of a control system.

Optionally, a shelf 34 and wire baskets 36 may be provided in freezer compartment 14. Additionally or alternatively, an ice maker 38 may be provided in freezer compartment 14. A freezer door 42 and a fresh food door 44 close access openings to freezer and fresh food compartments 14, 12, respectively. Each door 42, 44 is mounted to rotate about its outer vertical edge between an open position, as shown in FIG. 1, and a closed position (not shown) closing the associated storage compartment. In alternative embodiments, one or both doors 42, 44 may be slidable or otherwise movable between open and closed positions. Freezer door 42 includes a plurality of storage shelves 46, and fresh food door 44 includes a plurality of storage shelves 48.

Figure 2:
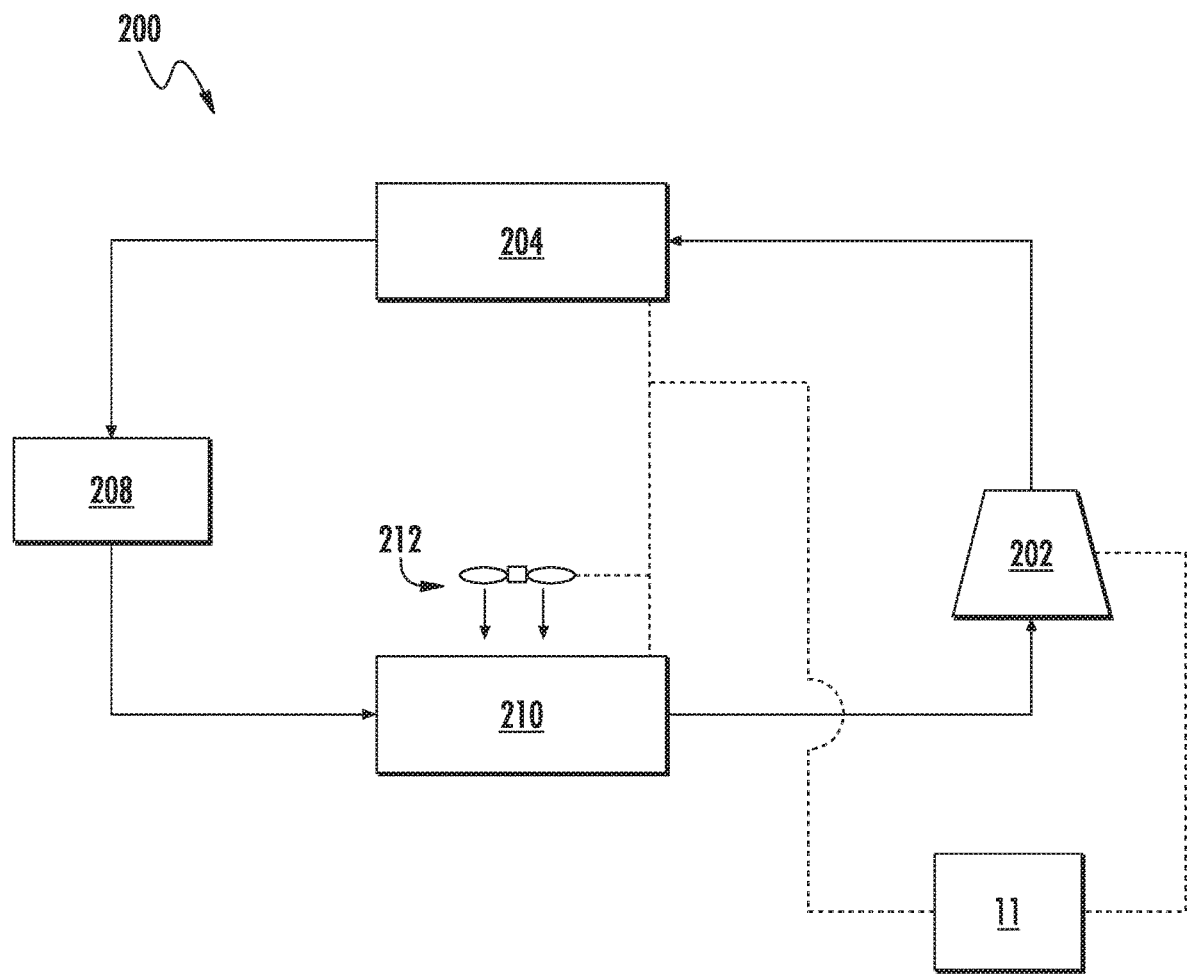
FIG. 2 provides a schematic view of various components of the exemplary embodiments of FIG. 1.

Referring now to FIG. 2, refrigerator appliance 10 may include a refrigeration system 200. In general, refrigeration system 200 is charged with a refrigerant that is flowed through various components and facilitates cooling of the fresh food compartment 12 and the freezer compartment 14. Refrigeration system 200 may be charged or filled with any suitable refrigerant. For example, refrigeration system 200 may be charged with a flammable refrigerant, such as R441A, R600a, isobutene, isobutane, etc.

Refrigeration system 200 includes a compressor 202 for compressing the refrigerant, thus raising the temperature and pressure of the refrigerant. Compressor 202 may for example be a variable speed compressor, such that the speed of the compressor 202 can be varied between zero (0) and one hundred (100) percent by controller 11. Refrigeration system 200 may further include a condenser 204 (e.g., a first phase separator), which may be disposed downstream of compressor 202 in the direction of flow of the refrigerant. Thus, condenser 204 may receive refrigerant from the compressor 202, and may condense the refrigerant by lowering the temperature of the refrigerant flowing therethrough due to, for example, heat exchange with ambient air).

Refrigeration system 200 further includes an evaporator 210 (e.g., a second phase separator) disposed downstream of the condenser 204. Additionally, an expansion device 208 may be utilized to expand the refrigerant—thus further reducing the pressure of the refrigerant—leaving condenser 204 before being flowed to evaporator 210. Evaporator 210 generally transfers heat from ambient air passing over the evaporator 210 to refrigerant flowing through evaporator 210, thereby cooling the air and causing the refrigerant to vaporize. An evaporator fan 212 may be used to force air over evaporator 210 as illustrated. As such, cooled air is produced and supplied to refrigerated compartments 12, 14 of refrigerator appliance 10. In certain embodiments, evaporator fan 212 can be a variable speed evaporator fan, such that the speed of fan 212 may be controlled or set anywhere between and including, for example, zero (0) and one hundred (100) percent. The speed of evaporator fan 212 can be determined by, and communicated to, evaporator fan 212 by controller 11.

Turning now generally to FIGS. 3 through 8, in some embodiments, a phase separator 310 is provided in fluid communication with refrigeration system 200 (e.g., along the path of refrigerant motivated by compressor 202) (FIG. 2). In certain embodiments, one or both of condenser 204 and evaporator 210 may include or be provided as phase separator 310. For instance, one phase separator 310 may be provided at condenser 204. Additionally or alternatively, another phase separator 310 may be provided at evaporator 210. Moreover, it is understood that additional or alternative configurations would be necessarily encompassed by the present disclosure. Although unique exemplary embodiments are described with respect to FIGS. 3 through 6, FIG. 7, and FIG. 8, it is understood that such embodiments are non-limiting and non-exclusive. Identical reference numerals are thus used to identify common elements. As would be understood, additional or alternative embodiments may include one or more features of the below-described embodiments.

Generally, phase separator 310 includes a separator body 312 defining a refrigerant cavity 314. In particular, an inner face 316 defines refrigerant cavity 314 within separator body 312. An outer face 318 of separator body 312 is formed opposite inner face 316 and is directed outward or away from refrigerant cavity 314. As will be described in detail below, at least a portion of outer face 318 may include a static shear surface 320.

A fluid inlet 322 and a fluid outlet 324 are generally defined through separator body 312. Both inlet 322 and outlet 324 are in fluid communication with refrigerant cavity 314. As shown, fluid inlet 322 is defined upstream from fluid outlet 324. When assembled, both fluid inlet 322 and fluid outlet 324 are in fluid communication with refrigeration system 200 (e.g., along the path of refrigerant motivated by compressor 202) (FIG. 2). During operations, fluid refrigerant may thus flow (as indicated at arrows 326) through fluid inlet 322 and into refrigerant cavity 314 before exiting fluid outlet 324. In the case of phase separator 310 as a condenser (e.g., condenser 204—FIG. 2), fluid refrigerant 326 may enter fluid inlet 322 as a compressed gas (e.g., from compressor 202) and exit fluid outlet 324 as a liquid (e.g., upstream from evaporator 210 or expansion device 208—FIG. 2). In the case of phase separator 310 as an evaporator (e.g., evaporator 210), fluid refrigerant 326 may enter fluid inlet 322 as a liquid (e.g., from condenser 204 or expansion device 208) and exit fluid outlet 324 as a gas (e.g., upstream from compressor 202).

Figure 3:
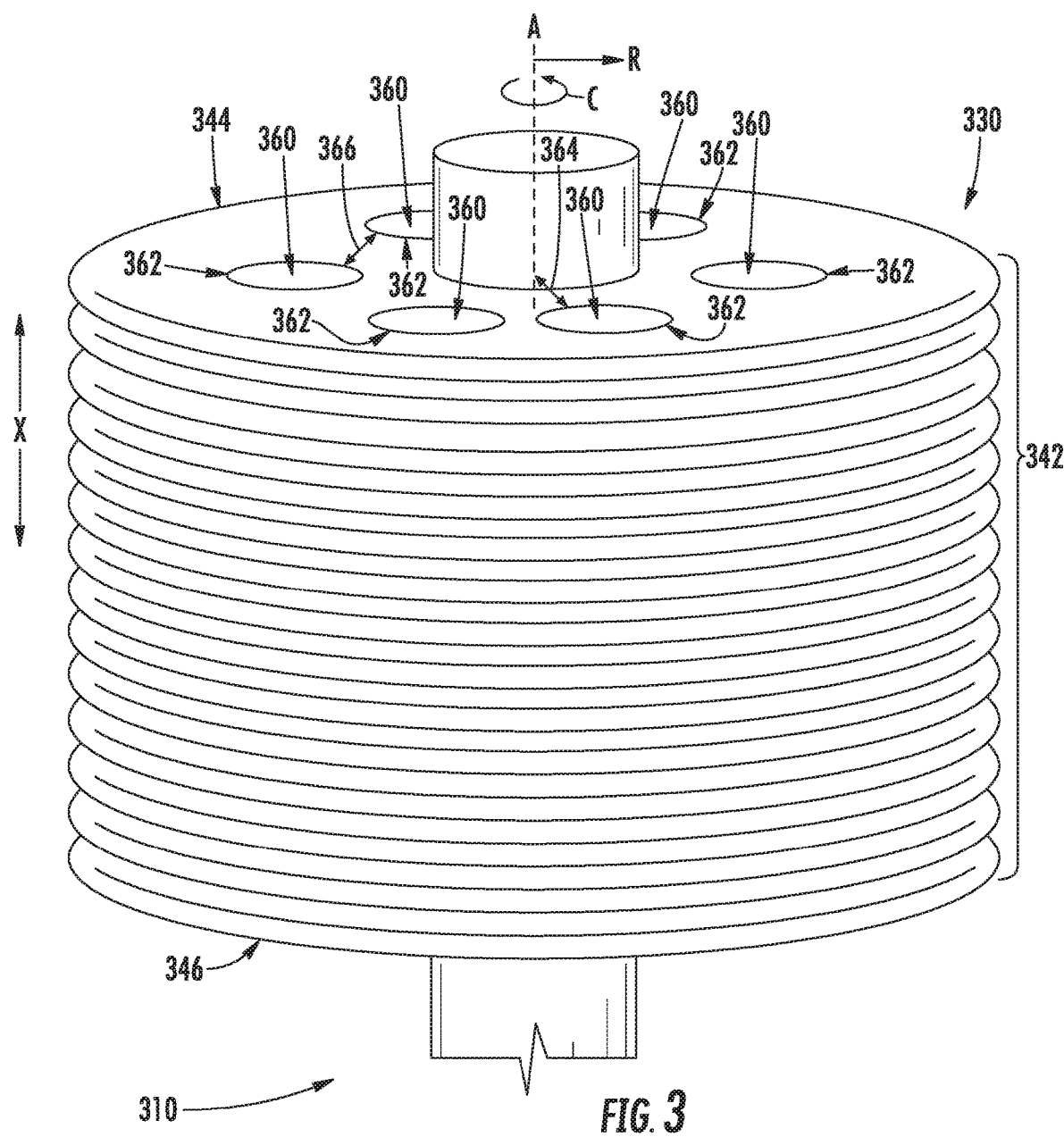
FIG. 3 provides a perspective view of a portion of a phase separator and rotatable heat exchanger of a sealed refrigeration system according to exemplary embodiments of the present disclosure.
Figure 4:
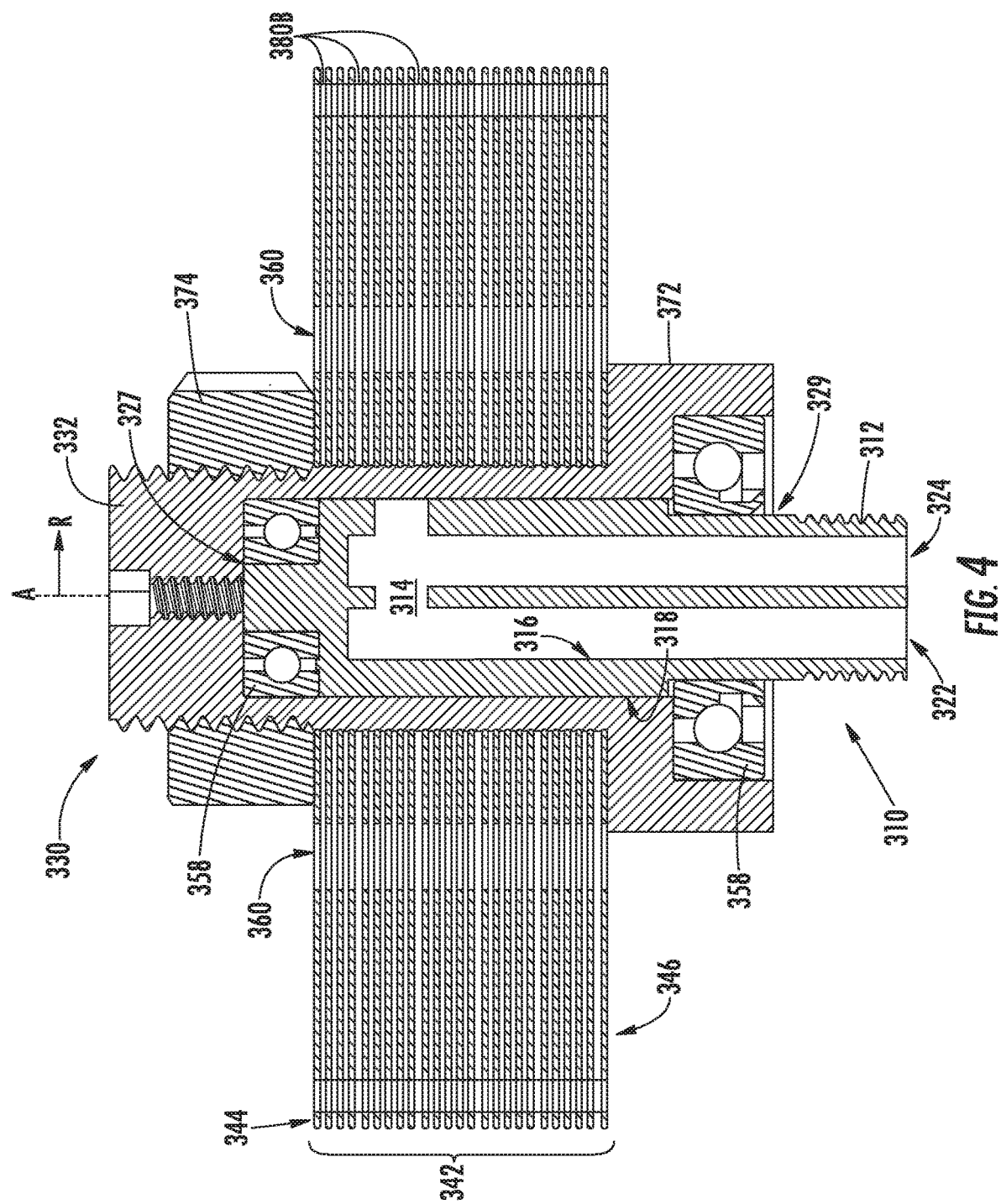
FIG. 4 provides a cross-sectional, perspective view of the exemplary embodiments of FIG. 3.
Figure 5:
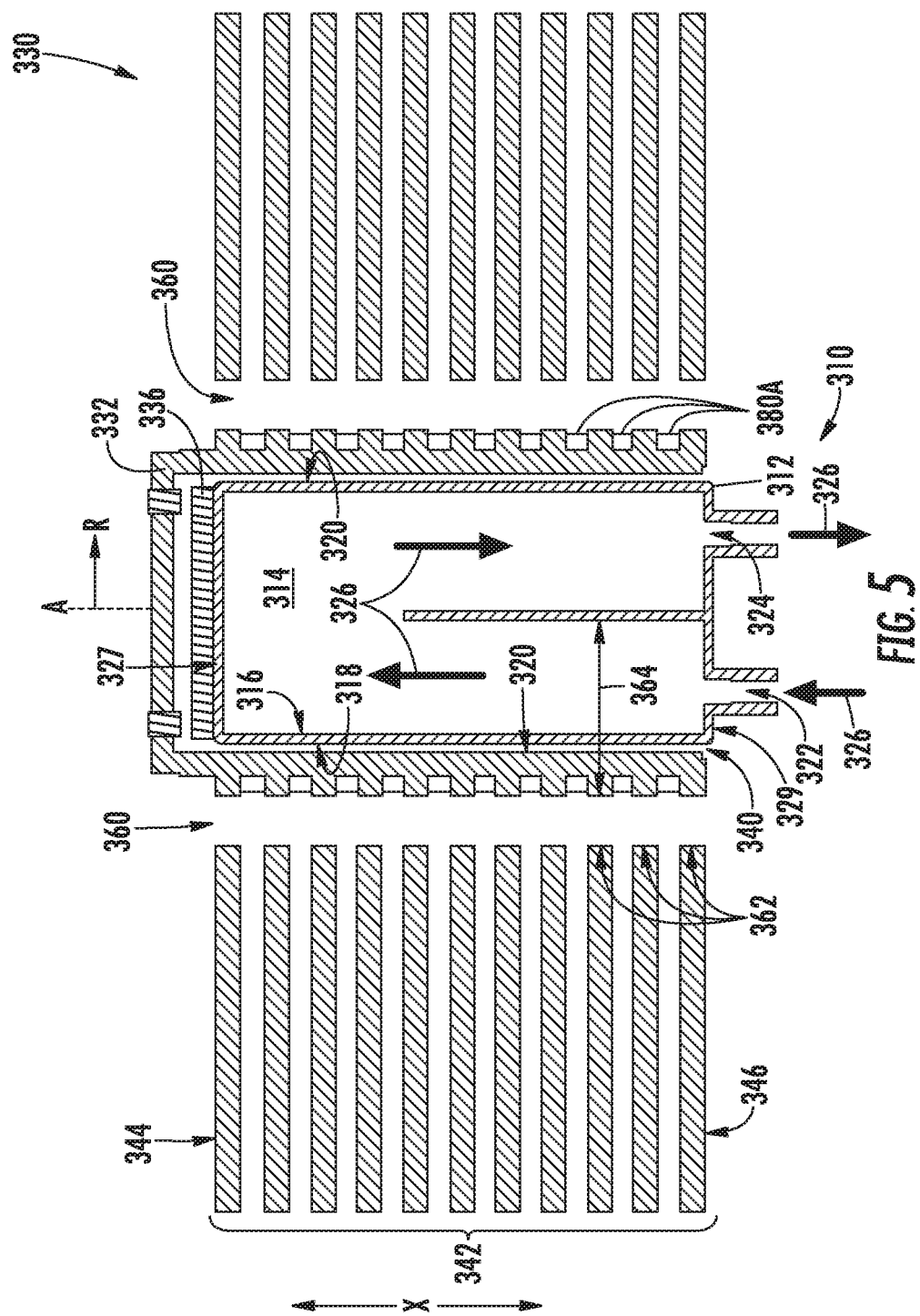
FIG. 5 provides a cross-sectional schematic view of a phase separator and rotatable heat exchanger of a sealed refrigeration system according to exemplary embodiments of the present disclosure.

Although both fluid inlet 322 and fluid outlet 324 are shown as being defined through a common end of separator body 312 (e.g., bottom end 329) in the exemplary embodiments of FIGS. 3 through 5, alternative embodiments may define fluid inlet 322 and fluid outlet 324 at opposite ends. For instance, as shown in the exemplary embodiments of FIG. 8, some embodiments may provide fluid inlet 322 at a top end 327 of separator body 312 while fluid outlet 324 is defined at a bottom end 329 of separator body 312 (e.g., directly below fluid inlet 322). In some such embodiments, fluid refrigerant 326 may enter fluid inlet 322 as a compressed gas before exiting fluid outlet 324 therebelow as a liquid.

As shown, a rotatable heat exchanger 330 may be provided on or adjacent to phase separator 310. Generally, rotatable heat exchanger 330 includes a thermally conductive body 332 (e.g., formed from one or more conductive materials, such as aluminum, copper, or tin, as well as alloys thereof). Moreover, rotatable heat exchanger 330 may define a rotation axis A about which thermally conductive body 332 rotates. An axial direction X may be defined parallel to the rotation axis A, and a radial direction R may be defined perpendicular to the rotation axis A (e.g., outward from the rotation axis A). A circumferential direction C may be defined about the rotation axis A (e.g., along a plane perpendicular to the rotation axis A).

When assembled, phase separator 310 may be positioned at least partially within thermally conductive body 332. In other words, thermally conductive body 332 may be in a position that extends at least partially about phase separator 310. Phase separator 310, including cavity 314, may extend along or about a portion of the rotation axis A. Optionally, one or more bearings 358 may extend between thermally conductive body 332 and outer face 318 of separator body 312 (e.g., in the radial direction R at a top end 327 and a bottom end 329 of separator body 312). Rotatable heat exchanger 330 may thus rotate about phase separator 310 while separator body 312 remains static.

In exemplary embodiments, conductive body 332 is operably connected (e.g., mechanically connected) to a suitable motor 336 (e.g., electro-magnetic motor 336). For instance, motor 336 may be mounted in an enclosed position between separator body 312 and rotatable heat exchanger 330 (e.g., at top end 327 of phase separator body 312). As would be generally understood, one or more drive shafts or intermediate gears (not pictured) may be provided to couple or connect motor 336 to conductive body 332. Thus, when assembled, motor 336 generally serves to motivate or rotate thermally conductive body 332 about the rotation axis A and at least a portion of outer face 318.

Figure 6:
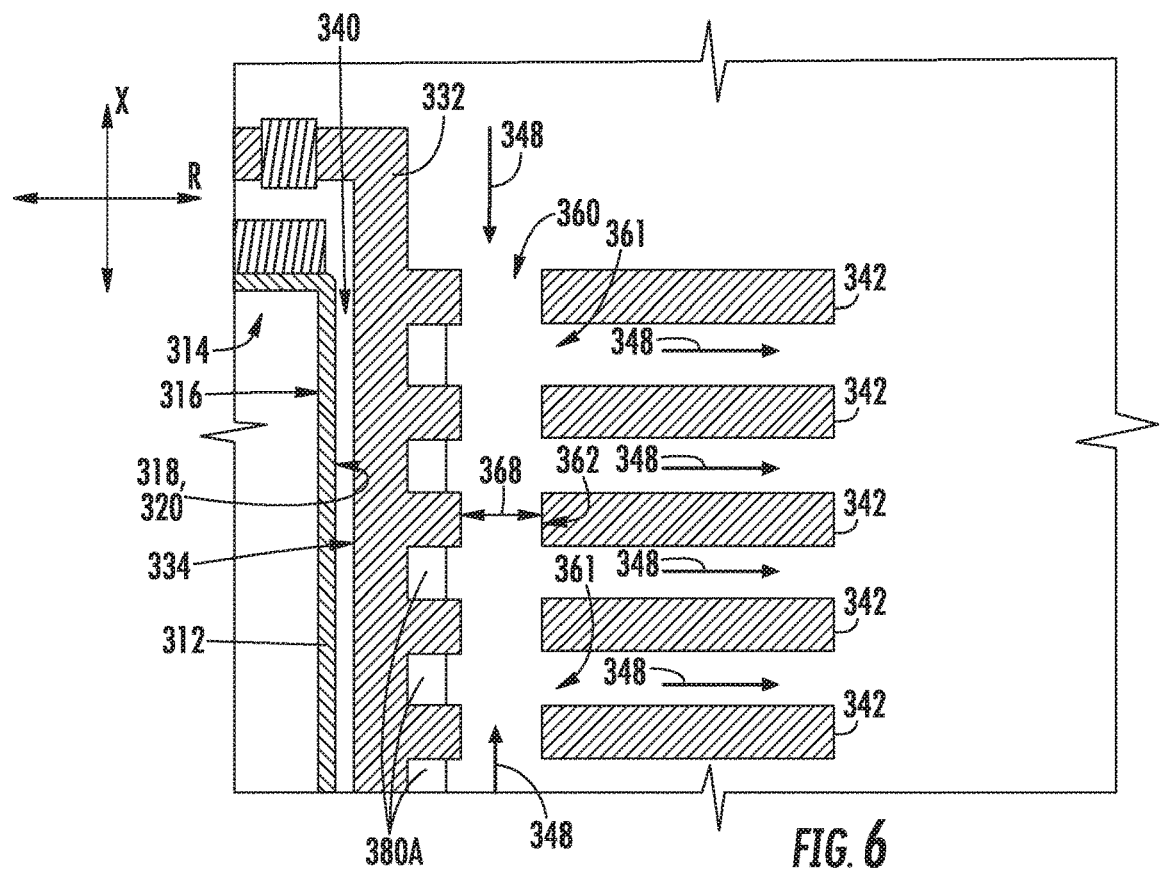
FIG. 6 provides a magnified, cross-sectional, schematic view of a portion of the exemplary embodiments of FIG. 5.
Figure 7:
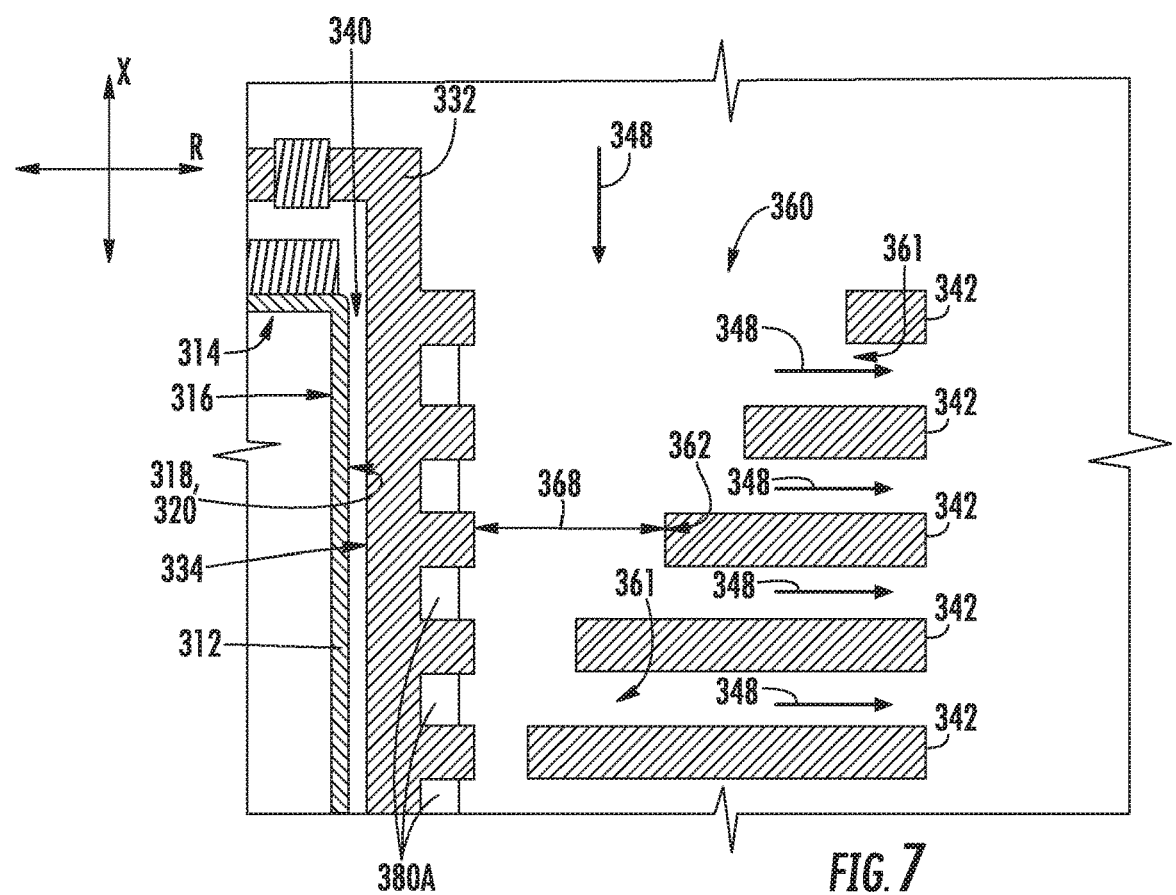
FIG. 7 provides a magnified, cross-sectional, schematic view of a portion of other exemplary embodiments of the present disclosure.

As shown, especially in FIGS. 5 through 7, at least a portion of thermally conductive body 332 is spaced apart from phase separator 310 in or along the radial direction R. In some embodiments, at least a portion of thermally conductive body 332 defines a dynamic shear surface 334 that is directed toward (i.e., faces) at least a portion of the outer face 318 of separator body 312 (e.g., static shear surface 320). Generally, dynamic shear surface 334 can be moved or rotated relative to phase separator 310. For instance, thermally conductive body 332, including dynamic shear surface 334, may be rotated about rotation axis A without directing dynamic shear surface 334 away from static shear surface 320. Thus, even as dynamic shear surface 334 rotates, dynamic shear surface 334 remains directed toward (i.e., faces) static shear surface 320. One or both of the dynamic shear surface 334 and the static shear surface 320 may be provided as a high-polish, non-permeable surface.

A set fluid gap 340 may be defined in the space between the dynamic shear surface 334 and the static shear surface 320. In particular, fluid gap 340 may be defined as a radial distance. In some such embodiments, fluid gap 340 is maintained as a constant distance between dynamic shear surface 334 and static shear surface 320 (e.g., a constant radial distance along a portion of the axial direction X between top end 327 and bottom end 329 of separator body 312). For instance, dynamic shear surface 334 may be a cylindrical surface formed about phase separator 310. A portion of outer face 318 318 (e.g., static shear surface 320) may be matched as a corresponding cylindrical surface (e.g., having a smaller diameter 368 than the cylindrical surface of dynamic shear surface 334). Thus, the static shear surface 320 may be a cylindrical surface of phase separator 310. Moreover, at least a portion of separator body 312 may be nested within—and coaxial with—a portion of thermally conductive body 332. Rotational bearings 358 (FIG. 4) may bound dynamic shear surface 334 and static shear surface 320 along the axial direction X. For example, one rotational bearing 358 may be positioned above surfaces 320, 334 and another rotational bearing 358 may be positioned below surfaces 320, 334.

In some embodiments, the fluid gap 340 is between 0.0005 inches and 0.005 inches. For instance, the fluid gap 340 may be defined as a distance (e.g., radial distance or length) of about 0.001 inches. Although a fluid (e.g., air) may fill the spacing of fluid gap 340, the fluid gap 340 may be otherwise free of any solid intermediate members that might establish contact or conductive thermal communication between the dynamic shear surface 334 and the static shear surface 320. Thus, the dynamic shear surface 334 may rotate relative to the static shear surface 320 without either surface 334, 320 contacting the other. In some such embodiments, the fluid gap 340 is generally open to the ambient environment. Air may thus be permitted to pass between the ambient environment and the fluid gap 340 (e.g., along an axial opening). During use, rotation of thermally conductive body 332 may form a fluid film (e.g., air film) within the fluid gap 340. Advantageously, power density of the rotatable heat exchanger 330 may be significantly increased. Moreover, the rotatable heat exchanger 330 and thermally conductive body 332 may notably utilize a comparatively small size while maintaining sufficient exchange capacity. Additionally or alternatively, the efficiency at the phase separator 310 may be increased or improved.

Returning generally to FIGS. 3 through 8, a plurality of spaced planar fins 342 extend from the thermally conductive body 332. In particular, each fin 342 extends in the radial direction R from thermally conductive body 332 (e.g., away from the fluid gap 340). Moreover, each fin 342 is in conductive thermal communication with thermally conductive body 332. In some such embodiments, the fins 342 are separably attached to (e.g., in direct or indirect contact with) thermally conductive body 332 (e.g., as discrete removable discs). Additionally or alternatively, the fins 342 may be formed from a conductive material that is the same or different from the material of thermally conductive body 332. For instance, the fins 342 may be formed from stainless steel, aluminum, copper, or tin, as well as alloys thereof.

The plurality of fins 342 defines one or more axial intake channels 360 extending parallel to the rotation axis A (e.g., along the axial direction X) through the fins 342. As shown, each channel 360 is defined by a plurality of axially-aligned apertures 362. For instance, each fin 342 may define an aperture 362 for a corresponding channel 360. When assembled, each aperture 362 of a channel 360 may be aligned along the axial direction X (e.g., parallel) with the other apertures 362 of the corresponding channel 360. In embodiments wherein multiple axial intake channels 360 are defined, each fin 342 may define multiple apertures 362. In particular, a discrete aperture 362 may be defined by each fin 342 for each corresponding channel 360.

As shown, especially in FIG. 3, multiple axial intake channels 360 may be defined through the plurality of fins 342. In some such embodiments, each channel 360 is defined at a common radial distance 364 from the rotation axis A. The radial distance 364 between one channel 360 and the rotation axis A may thus be the same as the radial distance 364 between another channel 360 and the rotation axis A. In additional or alternative embodiments, each of the channels 360 is circumferentially spaced. Thus, adjacent channels 360 will be defined at parallel positions that are spaced apart along the circumferential direction C about the rotation axis A. Optionally, each channel 360 may be defined at a common circumferential distance 366 from any adjacent channel 360. In other words, every pair of adjacent channels 360 (i.e., adjacent-channel 360 pairs) may define the same circumferential distance 366.

Turning especially to FIGS. 6 and 7, the apertures 362 of a corresponding channel 360 generally define a diameter 368 perpendicular to the rotation axis A or axial direction X. Each axial intake channel 360 may thus define an air flow path through the stack of fins 342 parallel to the rotation axis A (e.g., along the axial direction X). Moreover, each pair of adjacent fins 342 may define a discrete radial exhaust channel 361 parallel to the adjacent fins 342. As shown, each exhaust channel 361 is in fluid communication between intake channels 360 and the ambient environment.

As the fins 342 rotate, rotatable heat exchanger 330 may act similarly to a Tesla turbine. An airflow (as indicated at arrows 348) may be drawn along the axial direction X into the channels 360. In some embodiments, the airflow 348 flows into the channels 360 from opposite axial ends the plurality of fins 342 (e.g., from a first end 344 as well as a second end 346—FIG. 4). Within the plurality of fins 342, the airflow 348 passes from intake channels 360 to one or more exhaust channels 361 defined between adjacent fins 342. From channels 360, the airflow 348 is directed radially outward through radial exhaust channels 361 (i.e., between adjacent fins 342) before being exhausted from heat exchanger 330. Advantageously, rotatable heat exchanger 330 may promote a heat exchange between the fins 342 and airflow 348 without generating the noise associated with, for example, an axial blower fan.

As shown in the exemplary embodiments of FIG. 6, each aperture 362 may have an equal diameter 368. Thus, the channel 360 has a constant diameter along the axial direction X. However, as shown in the alternative embodiments of FIG. 7, the diameters 368 between aligned apertures 362 may also vary. For instance, the diameters 368 taper the axial intake channel 360 (e.g., such that the channel 360 has a frusto-conical profile). Optionally, the diameters 368 may be progressively reduced along the axial direction X. In certain embodiments, each subsequent fin 342 defines an aperture 362 that has a smaller diameter 368 than the aperture 362 above the subsequent fin 342.

Returning again to FIGS. 3 through 8, the spaced planar fins 342 are generally provided as parallel conductive plates. In particular, each fin 342 may be parallel to the other fins 342 and, optionally, parallel to the radial direction R. Thus, the fins 342 may extend perpendicular to the rotation axis A. The fins 342 may share a common diameter 368 or, alternatively, be tapered such that the overall plurality of fins 342 forms a frusto-conical profile. Together, the fins 342 may be held on thermally conductive body 332 by one or more axial collars 372, 374 that are fixed to (e.g., integral with) or removably attached to thermally conductive body 332. For instance, a base collar 372 may be formed on or fixed to bottom end 329 of thermally conductive body 332 while a variable collar 374 may be removably attached to thermally conductive body 332 (e.g., via a threaded interface) at top end 327 of thermally conductive body 332.

In some embodiments, a plurality of spacers 380A or 380B maintain or hold the fins 342 apart from each other on the axial direction X. In optional embodiments, each fin 342 is held at a common axial distance from any adjacent fins 342. In other words, every pair of adjacent fins 342 (i.e., adjacent-fin pairs) may define the same axial distance. Thus, the same axial distance may be defined between every top-bottom fins 342 that form an adjacent pair.

The spacers 380A, 380B may be formed according to any suitable shape or structure. As an example, the spacers 380A or 380B may be provided as annular or toroidal collars extending about the thermally-conductive body 332. As another example, the spacers 380A or 380B may be provided as discrete solid feet or sub-discs. Multiple solid feet may thus be provided between each pair of adjacent fins 342. For instance, between a single pair of adjacent fins 342, multiple solid feet may be positioned at unique circumferential locations about rotation axis A. Such spacers 380A or 380B may be fixed to, and rotate with, fins 342. As yet another example, the spacers 380A or 380B may be provided as integral extrusions or embossments extending (e.g., in the axial direction X) from the fins 342. Multiple extrusions or embossments may be provided between each pair of adjacent fins 342. For instance, between a single pair of adjacent fins 342, several extrusions or embossments may be formed at unique circumferential locations about rotation axis A.

Figure 8:
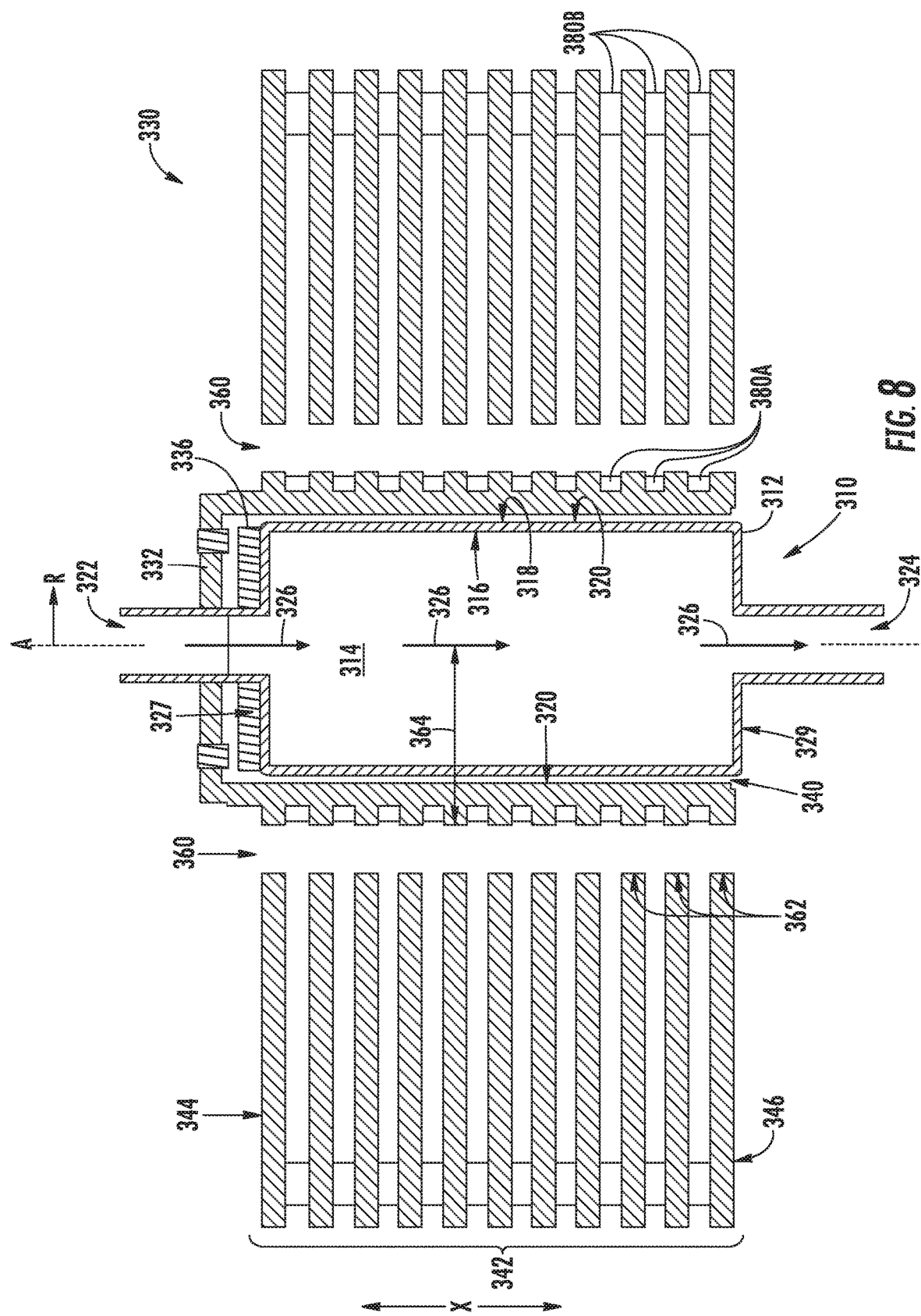
FIG. 8 provides a cross-sectional schematic view of another phase separator and rotatable heat exchanger of a sealed refrigeration system according to exemplary embodiments of the present disclosure.

In some embodiments, each spacer of a plurality of spacers (e.g., spacers 380A) is positioned radially inward from the axial intake channels 360. However, as illustrated in FIG. 8, additional or alternative embodiments include a plurality of spacers (e.g., spacers 380B) radially outward from the axial intake channels 360. Such spacers 380B may each maintain the set axial distance between fins 342 (e.g., at a radial perimeter of the fins 342) while still permitting air to flow radially outward between adjacent fins 342. Notably, an inertial component may be added to the flow of air being exhausted from adjacent fins 342 as the fins 342 rotate. Optionally, multiple sets or pluralities of spacers 380A and 380B may be provided. In some such embodiments, a first plurality of spacers 380A is positioned radially inward from the axial intake channels 360 while a second plurality of spacers 380B is positioned radially outward from the axial intake channels 360.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A sealed refrigeration system comprising:
   a compressor to compress a refrigerant fluid through the sealed refrigeration system;
   a phase separator in fluid communication with the compressor, the phase separator comprising a separator body defining an inner face and an outer face, the inner face defining a refrigerant cavity within the separator body, and the outer face directed away from the refrigerant cavity opposite the inner face; and
   a rotatable heat exchanger comprising
      a thermally conductive body positioned circumferentially about the outer face of the separator body and extending along a rotation axis to nest the separator body within the thermally conductive body, and
      a plurality of spaced planar fins extending from the thermally conductive body in a radial direction away from the phase separator, the plurality of spaced planar fins defining an axial intake channel extending parallel to the rotation axis through two or more planar fins of the plurality of spaced planar fins to define an open air flow path through the plurality of spaced planar fins, the plurality of spaced planar fins being mutually-parallel, axially-stacked, conductive plates, spaced apart along the rotation axis.

2. The sealed refrigeration system of claim 1, wherein the axial intake channel is one channel of a plurality of axial intake channels, and wherein each channel of the plurality of axial intake channels extends parallel to the rotation axis through two or more planar fins of the plurality of spaced planar fins.

3. The sealed refrigeration system of claim 2, wherein each channel of the plurality of axial intake channels is defined at a common radial distance from the rotation axis.

4. The sealed refrigeration system of claim 1, wherein the rotatable heat exchanger further comprises a plurality of spacers positioned radially inward from the axial intake channel.

5. The sealed refrigeration system of claim 1, wherein the rotatable heat exchanger further comprises a plurality of spacers positioned radially outward from the axial intake channel.

6. The sealed refrigeration system of claim 1, wherein the axial intake channel is defined by a plurality of axially-aligned apertures, wherein each fin of the plurality of spaced planar fins defines an aperture of the plurality of axially-aligned apertures.

7. The sealed refrigeration system of claim 6, wherein each aperture of the plurality of axially-aligned apertures defines an identical diameter.

8. The sealed refrigeration system of claim 6, wherein each aperture of the plurality of axially-aligned apertures defines a diameter, and wherein the axial intake channel is tapered along an axial direction by the diameters of the axially-aligned apertures, and wherein the axial direction is parallel to the rotation axis.

9. The sealed refrigeration system of claim 1, wherein the thermally conductive body defines a dynamic shear surface directed toward the outer face of the separator body, and wherein a set fluid gap is defined between the dynamic shear surface and the outer face.

10. A sealed refrigeration system comprising:
    a compressor to compress a refrigerant fluid through the sealed refrigeration system;
    a phase separator in fluid communication with the compressor, the phase separator comprising a separator body defining an inner face and an outer face, the inner face defining a refrigerant cavity within the separator body, and the outer face directed away from the refrigerant cavity opposite the inner face; and
    a rotatable heat exchanger comprising
       a thermally conductive body positioned circumferentially about the outer face of the separator body and extending along a rotation axis to nest the separator body within the thermally conductive body,
       a plurality of spaced planar fins extending from the thermally conductive body in a radial direction away from the phase separator, the plurality of spaced planar fins defining an axial intake channel extending parallel to the rotation axis through two or more planar fins of the plurality of spaced planar fins to define an open air flow path through the plurality of spaced planar fins, the plurality of spaced planar fins being mutually-parallel, axially-stacked, conductive plates, spaced apart along the rotation axis, and
       a plurality of spacers maintaining a common axial distance between adjacent-fin pairs of the plurality of planar fins.

11. The sealed refrigeration system of claim 10, wherein the axial intake channel is one channel of a plurality of axial intake channels, and wherein each channel of the plurality of axial intake channels extends parallel to the rotation axis through two or more planar fins of the plurality of spaced planar fins.

12. The sealed refrigeration system of claim 11, wherein each channel of the plurality of axial intake channels is defined at a common radial distance from the rotation axis.

13. The sealed refrigeration system of claim 10, wherein each spacer of the plurality of spacers is positioned radially inward from the axial intake channel.

14. The sealed refrigeration system of claim 10, wherein each spacer of the plurality of spacers is positioned radially outward from the axial intake channel.

15. The sealed refrigeration system of claim 10, wherein the plurality of spacers is a first plurality of spacers, wherein each spacer of the first plurality of spacers is positioned radially inward from the axial intake channel, wherein the rotatable heat exchanger further comprises a second plurality of spacers maintaining the common axial distance between adjacent-fin pairs of the plurality of planar fins, and wherein each spacer of the second plurality of spacers is positioned radially outward from the axial intake channel.

16. The sealed refrigeration system of claim 10, wherein the axial intake channel is defined by a plurality of axially-aligned apertures, wherein each fin of the plurality of spaced planar fins defines a discrete aperture of the plurality of axially-aligned apertures.

17. The sealed refrigeration system of claim 16, wherein each aperture of the plurality of axially-aligned apertures defines a diameter perpendicular to the rotation axis, and wherein each diameter is equal.

18. The sealed refrigeration system of claim 16, wherein each aperture of the plurality of axially-aligned apertures defines a diameter perpendicular to the rotation axis, and wherein the axial intake channel is tapered along an axial direction by the diameters of the axially-aligned apertures, and wherein the axial direction is parallel to the rotation axis.

19. The sealed refrigeration system of claim 10, wherein the thermally conductive body defines a dynamic shear surface directed toward the outer face of the separator body, and wherein a set fluid gap is defined between the dynamic shear surface and the outer face.

20. A refrigerator appliance, comprising:
- a cabinet defining a chilled chamber; and
- a sealed refrigeration system mounted to the cabinet to cool the chilled chamber, the sealed refrigeration system comprising
  - a compressor to compress a refrigerant fluid through the sealed refrigeration system,
  - a phase separator in fluid communication with the compressor, the phase separator comprising a separator body defining an inner face and an outer face, the inner face defining a refrigerant cavity within the separator body, and the outer face directed away from the refrigerant cavity opposite the inner face,
  - a thermally conductive body positioned circumferentially about the outer face of the separator body and extending along a rotation axis to nest the separator body within the thermally conductive body, and
  - a plurality of spaced planar fins extending from the thermally conductive body in a radial direction away from the phase separator, the plurality of spaced planar fins defining an axial intake channel extending parallel to the rotation axis through two or more planar fins of the plurality of spaced planar fins, to define an open air flow path through the plurality of spaced planar fins, the plurality of spaced planar fins being mutually-parallel, axially-stacked, conductive plates, spaced apart along the rotation axis,
- wherein the axial intake channel is defined by a plurality of axially-aligned apertures, and
- wherein each fin of the plurality of spaced planar fins defines a discrete aperture of the plurality of axially-aligned apertures parallel to each other aperture of the plurality of axially-aligned apertures.

\* \* \* \* \*